(12) United States Patent
Hemmelrath et al.

(10) Patent No.: US 8,998,315 B2
(45) Date of Patent: Apr. 7, 2015

(54) HEADREST WHICH CAN BE ADJUSTED IN THE X DIRECTION

(75) Inventors: Rudolf Hemmelrath, Leverkusen (DE); Thomas Frotz, Burscheid (DE); Denis Quandt, Aachen (DE)

(73) Assignee: Johnson Controls Technology Company, Holland, MI (US)

( * ) Notice: Subject to any disclaimer, the term of this patent is extended or adjusted under 35 U.S.C. 154(b) by 49 days.

(21) Appl. No.: 13/824,885

(22) PCT Filed: Sep. 20, 2011

(86) PCT No.: PCT/EP2011/004708
§ 371 (c)(1),
(2), (4) Date: Jun. 3, 2013

(87) PCT Pub. No.: WO2012/038067
PCT Pub. Date: Mar. 29, 2012

(65) Prior Publication Data
US 2013/0249268 A1 Sep. 26, 2013

(30) Foreign Application Priority Data
Sep. 20, 2010 (DE) .......... 10 2010 045 736

(51) Int. Cl.
*B60N 2/42* (2006.01)
*B60R 21/00* (2006.01)
*B60N 2/48* (2006.01)

(52) U.S. Cl.
CPC .............. *B60N 2/4864* (2013.01); *B60N 2/482* (2013.01); *B60N 2/4885* (2013.01)

(58) Field of Classification Search
USPC ............ 297/391, 216.12, 408, 400, 403, 409, 297/406, 407
See application file for complete search history.

(56) References Cited

U.S. PATENT DOCUMENTS

| | | | | |
|---|---|---|---|---|
| 6,045,181 A | * | 4/2000 | Ikeda et al. | 297/216.12 |
| 6,511,130 B2 | * | 1/2003 | Dinkel et al. | 297/410 |
| 6,863,343 B2 | * | 3/2005 | Pal et al. | 297/216.12 |
| 7,118,171 B2 | * | 10/2006 | Fowler et al. | 297/61 |
| 7,140,687 B2 | * | 11/2006 | Hoekstra et al. | 297/410 |
| 7,350,859 B2 | * | 4/2008 | Klukowski | 297/216.12 |
| 2004/0195894 A1 | | 10/2004 | Pal et al. | |
| 2006/0226689 A1 | * | 10/2006 | Linnenbrink et al. | 297/408 |

FOREIGN PATENT DOCUMENTS

| | | |
|---|---|---|
| DE | 10012973 A1 | 9/2001 |
| DE | 102006016270 A1 | 10/2007 |
| DE | 102008014273 B3 | 4/2009 |
| DE | 102008011336 A1 | 5/2009 |
| DE | 102009040069 A1 | 3/2011 |
| JP | S62137015 A | 6/1987 |
| WO | 9818367 A1 | 5/1998 |

OTHER PUBLICATIONS

International Search Report for application No. PCT/EP2011/004708 mailed Dec. 19, 2011.
(Continued)

*Primary Examiner* — Chi Q Nguyen
(74) *Attorney, Agent, or Firm* — Fletcher Yoder, P.C.

(57) ABSTRACT

The present invention relates to a headrest having a headrest box which is mounted on at least one retaining rod and can be displaced in the X direction.

3 Claims, 4 Drawing Sheets

(56) References Cited

OTHER PUBLICATIONS

German Examination Report of DE 10 2010 045 736.1-16; 6 pgs.; dated Apr. 12, 2011.

International Search Report and Written Opinion for PCT No. PCT/US2011/004708 dated Apr. 4, 2013; 8 pgs.

Japanese Office Action dated May 15, 2014.

\* cited by examiner

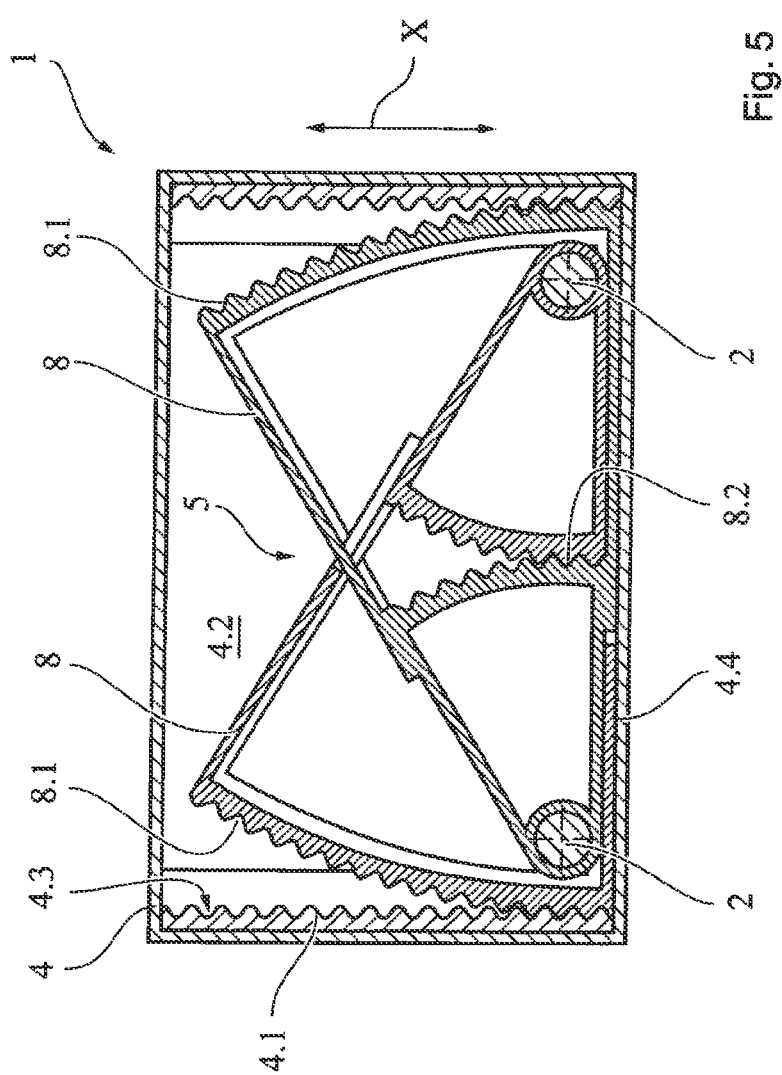

HEADREST WHICH CAN BE ADJUSTED IN THE X DIRECTION

CROSS REFERENCE TO RELATED APPLICATIONS

This application claims priority from and the benefit of PCT Application No. PCT/EP2011/004708, filed on Sep. 20, 2011; and German Patent DE 10 2010 045 736.1, filed on Sep. 20, 2010, which are herein incorporated by reference.

BACKGROUND

The present invention relates to a headrest having a headrest box which is mounted on at least one holding rod and which is provided so as to be displaceable in the X direction.

Such headrests are known from the prior art and are adjusted in the X direction, i.e. toward and away from the head of the seat occupant, for comfort and/or safety purposes. The person skilled in the art constantly strives here to make such headrests as simple as possible yet functionally reliable.

It was therefore the object of the present invention to make available a headrest which is provided in a simple manner but can be reliably adjusted in the X direction.

The object is achieved with a headrest having a headrest box which is mounted on at least one holding rod and which is provided so as to be displaceable in the X direction, wherein there is provided in the headrest box a synchronization means which is fixedly connected to the headrest box, is provided in one piece therewith and/or interacts therewith in an interlocking and/or frictional manner.

SUMMARY

The present invention relates to a headrest. Such headrests are provided, for example, on the backrest or on the body of a motor vehicle. These headrests are preferably adjustable in the Z direction, i.e. up and down, and, if appropriate in their angle of inclination.

The headrest according to the invention has a headrest box which is mounted on at least one, preferably two, holding rods. The headrest box can be an element with six side faces. However, for the purposes of the invention, a headrest box is, for example, also a shell which is not closed on one side. According to the invention, this headrest box is now provided so as to be displaceable in the X direction, i.e. toward and away from the head of the seat occupant. Furthermore, according to the invention, there is provided in the headrest box a synchronization means which is fixedly connected to the headrest box, is provided in one piece therewith and/or interacts therewith in an interlocking and/or frictional manner. As a result, the headrest box can be adjusted simply and reliably in the X direction without tilting.

The headrest box can preferably be locked in the respectively desired position.

The synchronization element is preferably at least one belt whose ends are in each case fastened on the inner side of the headrest box, in particular on opposite sides of the headrest box. The headrest according to the invention preferably has, for each adjusting direction, two belts which are provided in parallel at least in certain sections. The belts allow a synchronization of the movement of the headrest box both in the X and in the Z direction, i.e. up and down. Four belts with eight fastening points in the headrest box of the headrest according to the invention are therefore preferably provided. The belts preferably interact frictionally with a base element. The base element is preferably connected to the holding rod or rods. In a preferred embodiment of the present invention, this base element consists of in each case two rods for each adjusting direction, i.e. in the case of an adjustment in the X and Z direction the base element has four rods. The rods preferably have a circular cross section and, very particularly preferably, two of these rods are mounted on the holding rods of the headrest. The rods are preferably provided in a rotationally fixed manner. They can be manufactured as one part or connected to one another.

Each belt is preferably guided in an S-shaped manner about two rods in each case.

In a further preferred embodiment, the belt has interlocking and/or frictional means. In a very particularly preferred manner, the belt is therefore a toothed belt. The belt interacts in an interlocking and/or frictional manner with a rotary body, for example with rollers which are mounted in a very particularly preferred manner such that they can be rotated on the holding rods of the headrest. In this preferred embodiment of the present invention, too, the belt is guided in an S-shaped manner, said belt preferably being rotated here once through 180° about its longitudinal axis, particularly preferably between the two rotary bodies, and/or having interlocking and/or frictional means on two opposite surfaces.

According to a further preferred embodiment, the synchronization means has an interlocking and/or frictional means which is arranged on the side part which parallel to the adjusting direction of the headrest box, on the inner side thereof. This interlocking and/or frictional means preferably interacts with an interlocking and/or frictional means which is arranged on a rotatably mounted circular segment. This circular segment is preferably rotatably mounted on one of the holding rods of the headrest according to the invention. The headrest according to the invention particularly preferably has two such circular segments, each circular segment being rotatably mounted on one of the two holding rods of the headrest. These circular segments are preferably synchronized with one another in particular by interlocking and/or frictional means.

BRIEF DESCRIPTION OF THE DRAWINGS

The invention will be explained below with reference to FIGS. 1-5. These explanations are merely by way of example and do not limit the general idea of the invention.

FIG. 5 shows a further embodiment of the headrest according to the invention.

DETAILED DESCRIPTION

Figure 1:
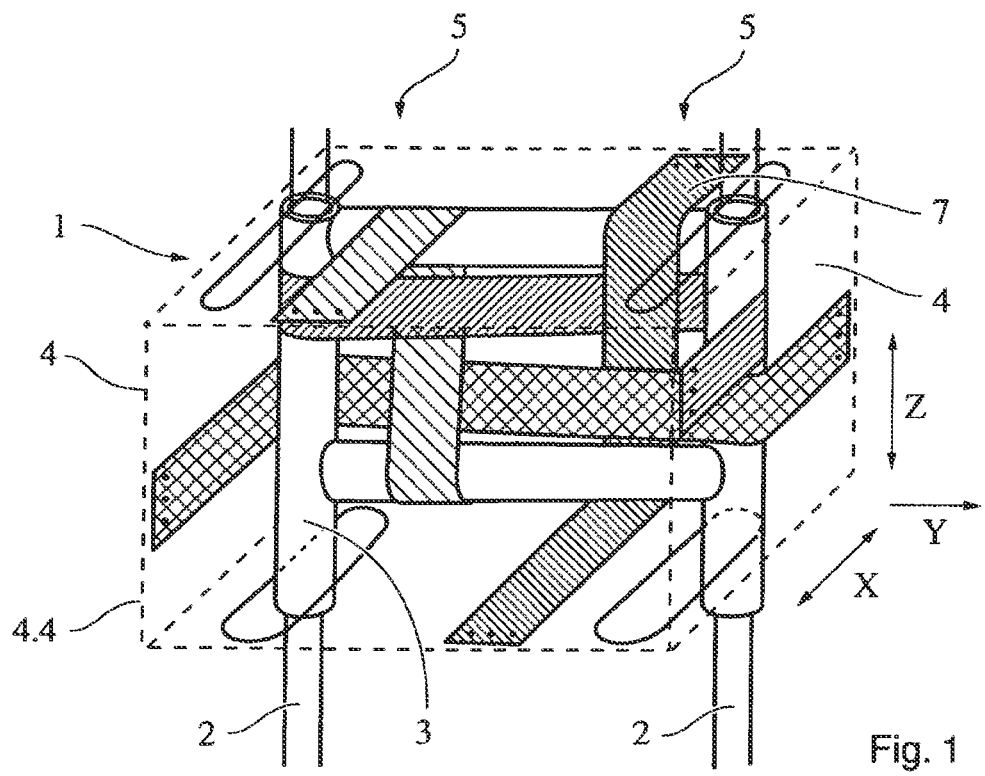
FIG. 1 shows a first embodiment of the headrest according to the invention.

FIG. 1 shows a first embodiment of this headrest 1 according to the invention. It has two holding rods 2 which are connected, for example, to the back rest of a vehicle seat. On these holding rods there is provided a headrest box 4 which, in the present case, is provided so as to be adjustable both in the X direction and in the Z direction, which is symbolized by the double arrows. In order to ensure that the headrest box does not tilt during this movement, the headrest according to the invention has a synchronization means 5. In the present case, this synchronization means 5 consists of in each case two belts for each adjusting direction. Each belt 7 is fastened with its two ends to in each case two opposite inner faces of the headrest box, for example by adhesive bonding, screwing, riveting or the like. The two belts 7 are provided in parallel to one another at least in certain sections. Each belt interacts frictionally with a base element 3 which consists, in the present case, of two cylinders oriented in the Z direction and two cylinders oriented in the Y direction. Each belt 7 is guided in an S-shaped manner about in each case two parallel cylinders, wherein, for each adjusting direction, the resulting S shape of one belt is provided with mirror symmetry to the S shape of the other belt. The mirror plane here extends in a plane which can be defined between the two center lines of the two cylinders. The two belts for each adjustment ensure a reliable, simple, torsion-free adjustment of the headrest box in the respective direction.

Figure 2:
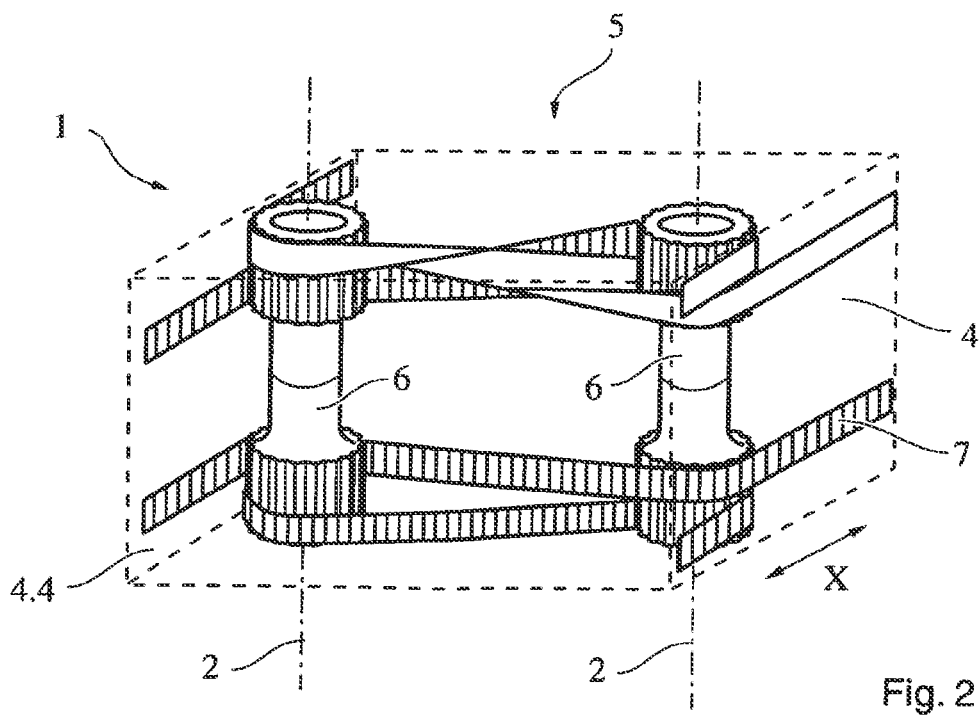
FIG. 2 shows a second embodiment of the headrest according to the invention.

FIG. 2 shows a further embodiment of the headrest according to the invention. Reference can be made essentially to the statements relating to FIG. 1, wherein in the present case the belts 7 have interlocking and/or frictional means at least on one side, i.e. the belts are provided, for example, as toothed belts. The belts are preferably now again guided in an S-shaped manner about two rotary bodies 6 which are provided such that they can rotate in the present case and which in turn have interlocking and/or frictional means, for example toothed segments whose teeth interact with the teeth of the toothed belt 7. The rotary bodies are preferably rotatably arranged on the holding rods 2 of the headrest. The rotary bodies are preferably rollers. In the upper region of FIG. 2, the belts are rotated in their central region through 180° about the longitudinal axis between the two rotary bodies 6. By means of this embodiment of the present invention, it is sufficient that the interlocking and/or frictional means, in this case the teeth, are provided on one side of the belt. By contrast, in the embodiment shown in the lower part of FIG. 2, the belts must be provided at least in certain sections on two mutually opposite sides. Both in the upper and in the lower region there are provided in each case two parallel belts whose S shape is in each case provided mirror-symmetrically with respect to a plane which can be defined between the center lines of the two rollers.

Figure 3:
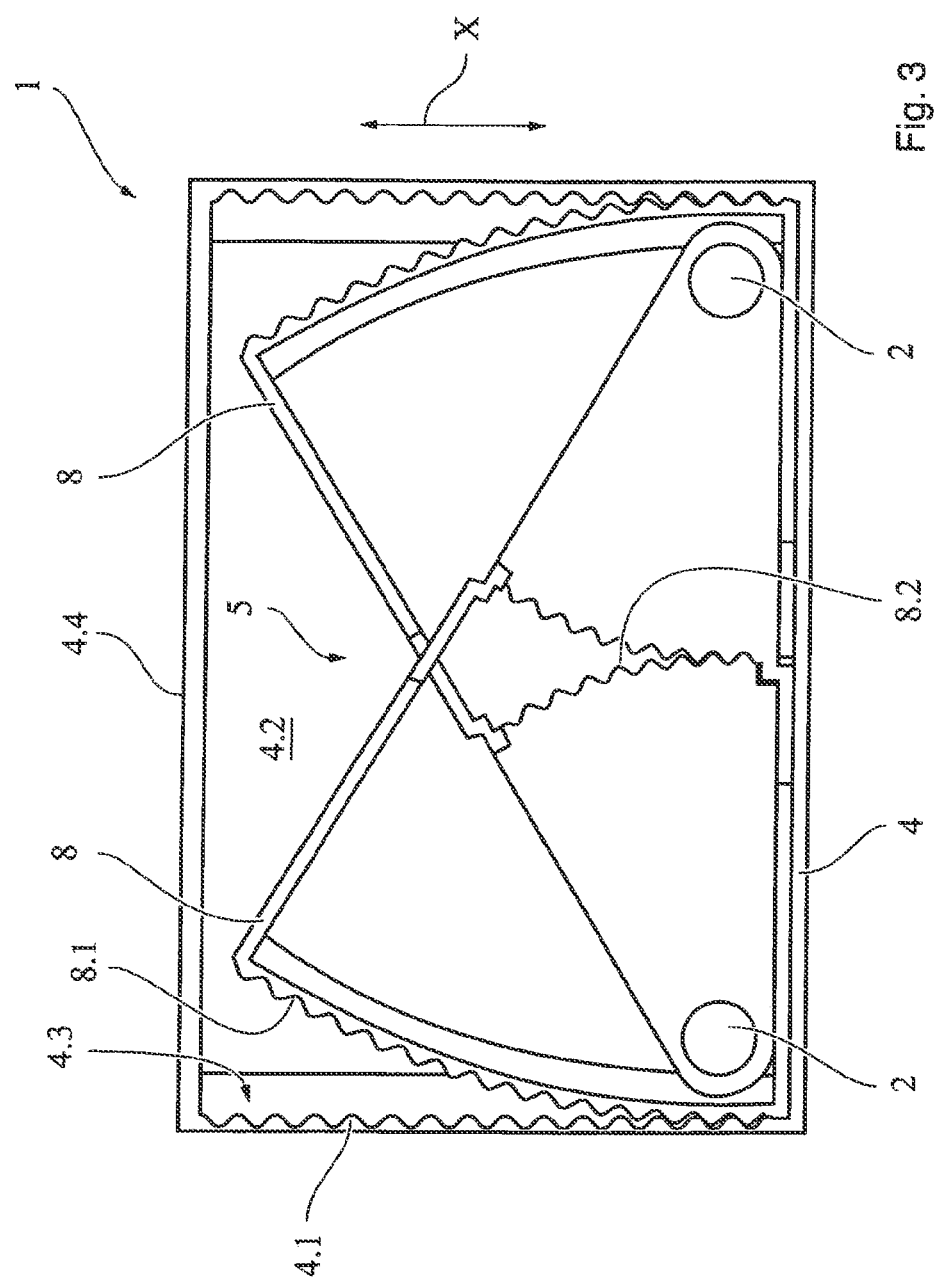
FIG. 3 shows a third embodiment of the headrest according to the invention.

FIG. 3 shows a further embodiment of the headrest according to the invention. This is again preferably mounted height-adjustably on two holding rods 2. In the present case, the headrest box 4 has interlocking and/or frictional means 4.1, here in the form of serrations, on its inner side, in particular on the side faces 4.3 which are provided parallel to the X adjusting direction. These interlocking and/or frictional means 4.1 interact in an interlocking and/or frictional manner with interlocking and/or frictional means 8.1 which on a circular segment 8 which is rotatably mounted about the holding rod 2. In the present case, the headrest according to the invention has two circular segments 8 which in each case interact in an interlocking and/or frictional manner with the side parts 4.3 of the headrest box 4, while the circular segment-shaped surface of the circular segment 8 rolls on the side part 4.3 during an adjustment of the headrest box in the X direction. Moreover, the circular segments 8 in each case have interlocking and/or frictional means 8.2 which mesh with one another, with the result that the rotational movement thereof is synchronized. As a result, a torsion-free adjustment of the headrest box 4 in the X direction is ensured.

Figures 4A, 4B:
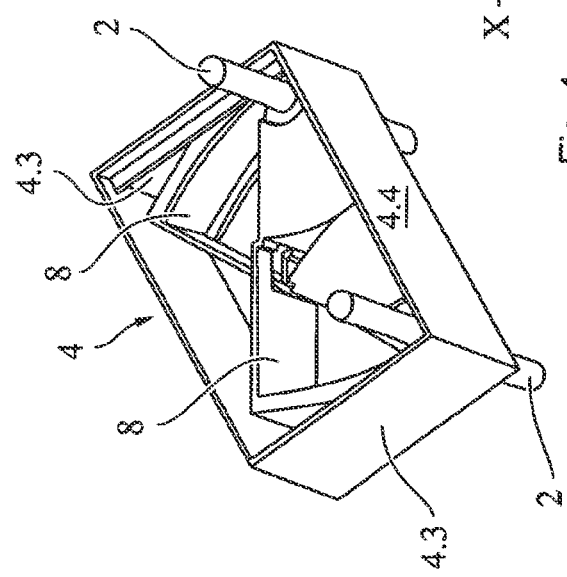
FIGS. 4a and 4b show the adjustment of the headrest according to FIG. 3.

FIGS. 4a and 4b show the adjustment of the headrest according to FIG. 3 in the X direction. It can clearly be seen that, during an adjustment of the headrest, as represented by the arrow, the circular segments 8 rotate about the holding rods 2.

FIG. 5 shows a further embodiment of the headrest according to the invention, wherein reference can be essentially made to the statements relating to the headrest according to FIGS. 3, 4a and 4b. In the present case, the interlocking and/or frictional means 4.1, 8.1 and 8.2 are teeth which mesh with one another. Otherwise, reference can be made to the statements according to FIGS. 3, 4a and 4b.

The invention claimed is:

1. A headrest comprising a headrest box mounted on at least one holding rod and displaceable in an X direction, and a synchronization device in and fixedly connected to the headrest box, wherein the synchronization device comprises two belts each arranged in an S-shape about two parallel cylinders to control displacement of the headrest box, and each belt comprises two ends, each end fastened to one of two opposite inner faces of the headrest box.

2. The headrest of claim 1, wherein the belts comprise toothed belts.

3. The headrest of claim 1, wherein the belts interact in an interlocking or frictional manner with the cylinders.

* * * * *